Aug. 17, 1937.   J. T. MARVIN ET AL   2,090,581
MULTIPLE PLUG GAS COCK
Filed Sept. 15, 1934
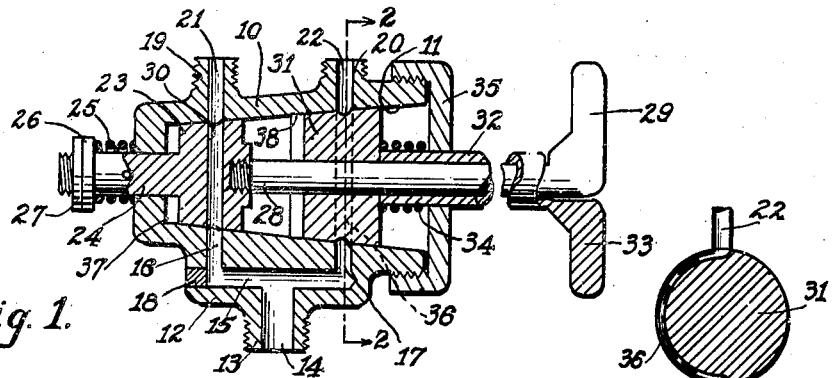
Fig. 1.
Fig. 2.
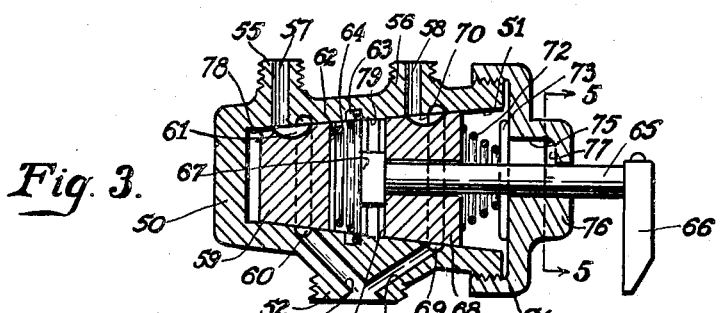
Fig. 3.
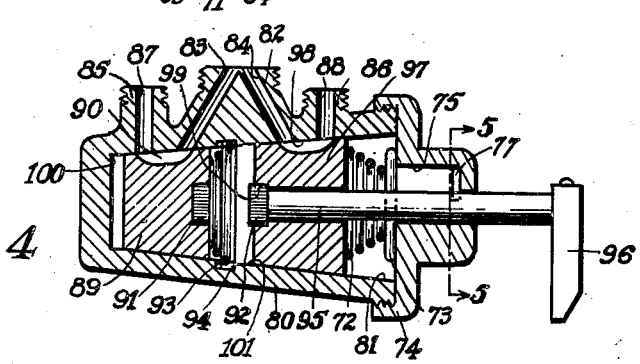
Fig. 4.
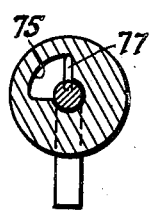
Fig. 5.
John T. Marvin
Edmund C. L. Rogers
INVENTORS.
BY Edmund C. L. Rogers
ATTORNEY Patented Aug. 17, 1937

2,090,581

UNITED STATES PATENT OFFICE 2,090,581

MULTIPLE PLUG GAS COCK

John T. Marvin, Fairview, and Edmund C. L. Rogers, Cleveland, Ohio, assignors to The Patrol Valve Company, Cleveland, Ohio, a corporation of Ohio Application September 15, 1934, Serial No. 744,224

3 Claims. (Cl. 277—59)

This application relates primarily to gas cocks, or valves of analogous use, and has for its object the provision of a single, unitary valve controlling a plurality of outlets.

A further object is to provide a valve of this type wherein a complete range of control is available for all the outlets.

A further object is to provide, a single valve controlling a plurality of outlets, control means for each outlet operable independently of the others.

A further object is to provide a valve housing containing a plurality of outlets, and a plurality of movable elements, one controlling the flow of gas to each outlet.

A further object is to provide a valve of this type having a fixed element and two movable elements, and means for urging both of said elements into sealing relation with the fixed element.

A further object is to provide a valve having a housing and a plurality of plugs, with said plugs controlling the flow of gas to a plurality of outlets, and with the control designed to prevent the presence of gas between the plugs.

A further object is to provide a two plug valve wherein an operating handle of one plug passes through the other plug, but without the necessity of having a seal about said handle.

A further object is to provide a two plug valve having means to take up wear on each plug or its related housing portion.

As shown in the accompanying drawing:

Fig. 1 is a longitudinal sectional view of one embodiment of the valve.

Fig. 2 is a transverse sectional view of line 2—2 on Fig. 1, shown diagrammatically.

Fig. 3 is a longitudinal sectional view of a second embodiment of this valve.

Fig. 4 is a longitudinal sectional view of a third embodiment of this valve.

Fig. 5 is a transverse sectional view on line 5—5 of the Figures 3 and 4.

In Fig. 1, the valve comprises a housing 10 having tapered bore or barrel 11 therein. On one side of this housing is an upstanding lug 12, having an inlet fitting 13 thereon. The inlet fitting has an inlet passage 14 dividing into a lengthwise passage 15, the latter terminating in passages 16 and 17 leading to the tapered bore 11 within the barrel. Passage 15 may be formed by drilling in from one end of lug 12 and then fitting a plug 18 into the end of the bore to seal the same, as is shown. Peripherally spaced on the housing from the inlet port 14 are outlet fittings 19 and 20. These may be spaced at any suitable point around the periphery of the valve and, for illustration only, are here shown as spaced diametrically from the inlet fitting 14. In fitting 19 is an outlet 21, and in fitting 20 is an outlet 22, both of which outlets communicate with tapered bore 11.

In drilling port 21, the drill may be passed across tapered bore 11, to drill port 16. Similarly ports 22 and 17 may be drilled by a single operation. Within the tapered bore are fitted two plugs. One of these plugs 23 is fitted into the small end or bottom of the bore and is tapered correspondingly to form a seal therewith. Extension 24 on plug 23 extends outwardly through the housing 10. Over the extension 24 is fitted a spring 24 held in place by a nut 26 which is correspondingly held in place by a lock nut 27, both of the latter being threaded on to the outwardly projecting end of the extension 24. A valve stem 28 is secured to the larger end of plug 23 opposite to and axially aligned with the extension 24. The stem 28 passes out of the open end of the valve housing 10 and terminates in the handle 29. A transverse passageway 30 extends through plug 23, and is adapted to provide communication between inlet 14 and outlet 21.

The second plug member 31, above referred to, is tapered to fit with a seal in the tapered bore 11. Extending from the larger or outer end of the plug 31 is a tubular extension 32 concentrically surrounding stem 28, and extending outside of the open end of the valve housing 10 where it terminates in a handle 33. A spring 34 surrounds this extension 32 and is held in position by a cap 35 threaded to close the end of housing 10. An arcuate passageway 36 extends around a portion of the periphery of plug 31 as is best shown in Fig. 2. This passage 36 establishes communication between inlet 14 and outlet 22.

Beneath each plug is provided a portion to take up wear. As shown on the drawing this comprises a cut-out 37 beneath plug 23 and a cut-out 38 beneath plug 31. These cut-outs are of a diameter not less than the inner or smaller diameters of their respective plugs, and provide a ready means for taking up wear in the valve.

The operation of the valve of Fig. 1 is as follows:

With the valve assembled as shown, spring 25 urges plug 23 toward the small end of housing 10 so as to provide a tight seal between plug 23 and the housing. Likewise spring 34 forces plug 31 into tight seal relation with the housing. Gas flows inwardly at 14 and thence divides to extend to inlet passages 16 and 17. Rotation of handle 29 rotates plug 23 and determines whether passageway 30 is in register with inlet 16 and outlet 21 or not. Quite obviously a range of operation for any desired flow of gas from outlet 21 is thus provided. Similarly plug 31 may be rotated by handle 33 to cause peripheral passageway 36 to be on or out of register with inlet 17 and outlet 22. This provides complete control of the flow of gas from outlet 22 quite independent of the adjustment of the flow in outlet 21.

The valve shown in Fig. 3 is in principle similar to that shown in Fig. 1. In this valve is a housing 50 having a tapered bore 51 therein. A lug 52 on one side of housing 50 is designed to be connected to a gas supply line. Two inlets 53 and 54 are provided in lug 52. Both of these inlets lead into the tapered bore 51. These inlets are angularly directed from the main inlet, whereby both may be drilled with a single setting of the drilling fixture. Peripherally spaced from inlet lug 52 are outlets 55 and 56. In outlet 55 is a passageway 57 and in outlet 56 is a passageway 58.

Within the tapered bore 51 is fitted a plug 59 tapered correspondingly to the bore so as to have a sealing fit therewith. An arcuate cut out 60 extends around housing 50 and communicates with inlet 53. Plug 59 has thereon a small cut-out 61 that may be provided with a keyway cutter or the like. The upper or larger end of plug 59 has a kerf 62 cut thereacross. In housing 50 is circumferential groove 63. Snapped into this groove is a spring member 64 that fits against plug 59 and urges it tightly into taper 51. A stem 65 provided at one end with a handle 66 has on the other end a spade-like portion or blade 67. This blade 67 is adapted to engage kerf 62 so that rotation of handle 66 rotates plug 59.

A tapered plug 68 is likewise fitted into taper 51. An annular cut-out 69 corresponding to cut-out 60 is provided in housing 50 to register with inlet port 54. Plug 68 has a small cut-out 70 therein corresponding to cut-out 61, the cut-out being designed to produce communication between annular cut-out 69 and outlet 58. A kerf 71 is provided in the inner or smaller end of plug 68 and receives the spade-like or blade element 67 of stem 65.

A spring 72 presses against plug 68 to hold it in position. A pin 73 is secured in stem 65 and against this pin spring 72 presses. Thus the spring holds plug 68 in sealing position in bore 51 and also holds stem 65 in its outward position so that the spade-like element 67 engages in plug 68. A cap member 74 is threaded over the open end of the housing 50 to seal the top of the housing. As is shown, pin 73 engages against cap 74.

A segmental cut out 75 shown best in Fig. 5 is provided in an extension 76 of cap member 74. Pin member 77 is fastened into stem 65 and projects into cut-out 75 as will be obvious. Pin 77 engages against the radial wall or segmental cut-out 75 to limit the movement of handle 66. Wear take up cut-outs 78 and 79 are provided respectively by the plugs 59 and 68.

The operation of valve of Fig. 3 is as follows:
In assembly, the valve plug 59 is fitted into the tapered bore 51 and the spring 64 is snapped into the groove 63 to hold the plug 59 in position. Spring 64 is designed to be radially compressible to permit its withdrawal in disassembly of the valve. Stem 65 is then passed through plug 68 and handle 66 attached thereto in any suitable manner. If desired it may be just a portion of stem 65 bent over to serve as a handle. Before adding the handle the spring 72 and pins 73 and 77, and cap member 74 are put in place. The spring 72 may be designed to fit over the spade-like element 67. The plug 68 and stem 65 are then inserted into the housing which is closed by the cap 74.

To rotate plug 68 handle 66 is turned. Obviously this gives a range of operation for complete control of the flow of gas in outlet 58 independently of that in 57. To operate plug 59 handle 66 is pressed inwardly against spring 72 so that blade 67 engages kerf or groove 62 of plug 59 and then plug 59 may be rotated as desired. It will be obvious that there is a neutral position for spade-like element 67 between engagement with the two plugs. This is provided to insure disengagement of blade 67 with one plug when it is engaged with the other, so as to give complete independent operation of the two plugs.

In the valve shown in Fig. 4 are embodied certain modifications over the previously shown valves. This valve has a housing 80 having a tapered bore 81. On one side of the housing 80 is an inlet fitting 82 having divergent inlet passages 83 and 84 leading to the tapered bore of housing 80. These passages are drilled at an angle to reduce the number of drilling operations necessary. Outlet fittings 85 and 86 are provided having outlet passages 87 and 88, the last mentioned passages leading to tapered bore 81. Fitted into bore 81 is a plug 89 tapered so as to have sealing relation therewith. In this plug is a cut-out portion 90 designed to provide communication with inlet 83 and outlet 87. In the larger end of plug 89 is a bore 91 having mills therein adapted to interfit with corresponding mills on the member 92 to be described hereafter. Annular groove 93 is formed in housing 81 to receive the largest convolution of coil spring 94 that may be snapped into the groove and which bears against plug 89 to hold it in place.

Member 92 is formed on the end of stem 95 that terminates in handle 96. A valve plug 97 is also fitted into taper bore 81 as shown and has sealing relation therewith. This plug has a cut-out 98 therein adapted to furnish communication between inlet 84 and outlet 88. Stem 95 passes freely rotatably through plug 97. The plug is provided with a bore 99 milled similarly to bore 91 to receive member 92 on stem 95.

A spring 72 is fitted over stem 95 and engages a pin 73. An arcuate cut-out 75 receives a pin 77 to limit rotation of the handle. This structure is identical with that of Fig. 2. The cap member 74 closes the open upper end of the housing. Wear take up cut-outs 100 and 101 are provided to take up wear in their respective plugs.

The operation of the device in Fig. 4 is similar to that of Fig. 3. Handle 96 when in the position shown, to which position it is normally forced by spring 72, engages with plug 97 so that rotation of the handle operates this plug to control the gas flow to outlet 88. Pressing the handle engages it with bore 91 and frees it from bore 99 so that plug 89 may be rotated.

What we claim is:
1. In a valve the combination of a housing tapered interiorly, port means in said housing, a plurality of tapered valve plugs rotatable in said housing for controlling said port means, a circumferential groove in the walls of the bore between said plugs, spring means lodged in said groove and acting upon one plug to urge it to- ward the smaller end of the housing, means for urging the other plug toward the small end of the bore, and means for rotating said plugs to control said port means.

2. In a valve the combination of a housing tapered interiorly, port means in said housing, a plurality of tapered valve plugs rotatable in said housing for controlling said port means, a circumferential groove in the walls of the bore between said plugs, spring means lodged in said groove and acting upon one plug to urge it toward the smaller end of the housing, means for urging the other plug toward the small end of the bore, cut away portions in said bore adjacent the smaller ends of said plugs for taking up wear and an actuating member in said valve for rotating either of said valve plugs.

3. In a valve the combination of a housing tapered interiorly, port means in said housing, a plurality of tapered valve plugs in said housing for controlling said port means, said plugs being located to provide a space therebetween, and spring means located in said space and acting upon the smaller plug to urge it toward the smaller end of the housing, means for urging the larger plug toward said small end of the housing, and means for rotating said plugs to control said port means.

JOHN T. MARVIN.
EDMUND C. L. ROGERS.